Aug. 15, 1939.  N. M. McCULLOUGH  2,169,267
VEHICLE SPEED ENGINE LIMITING DEVICE
Filed July 17, 1936
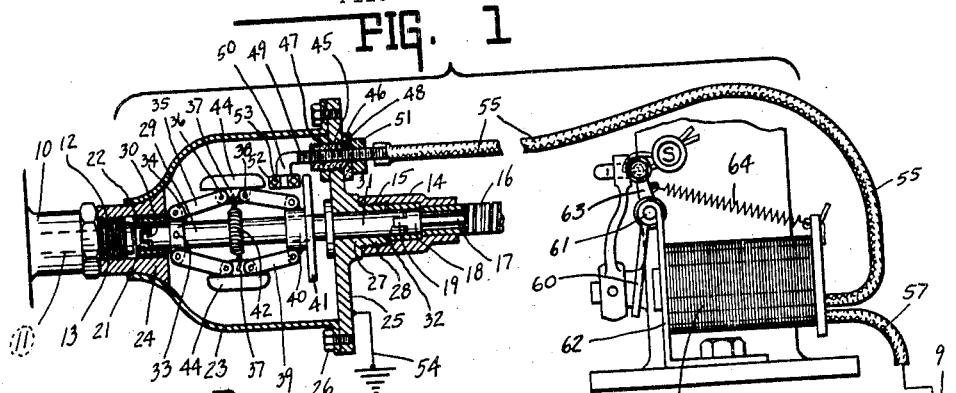
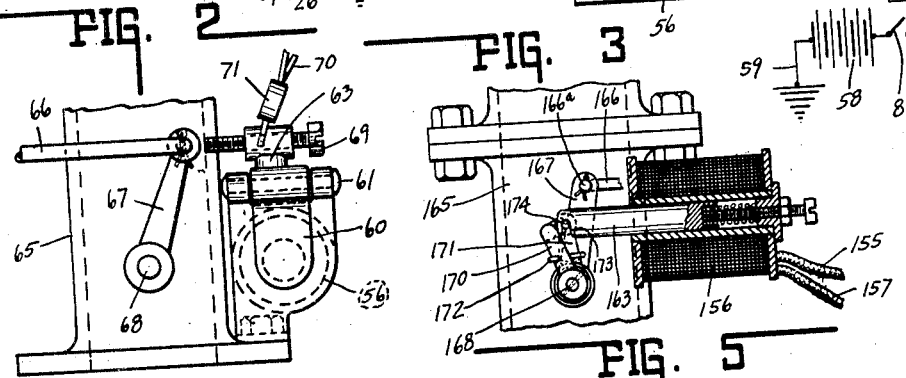
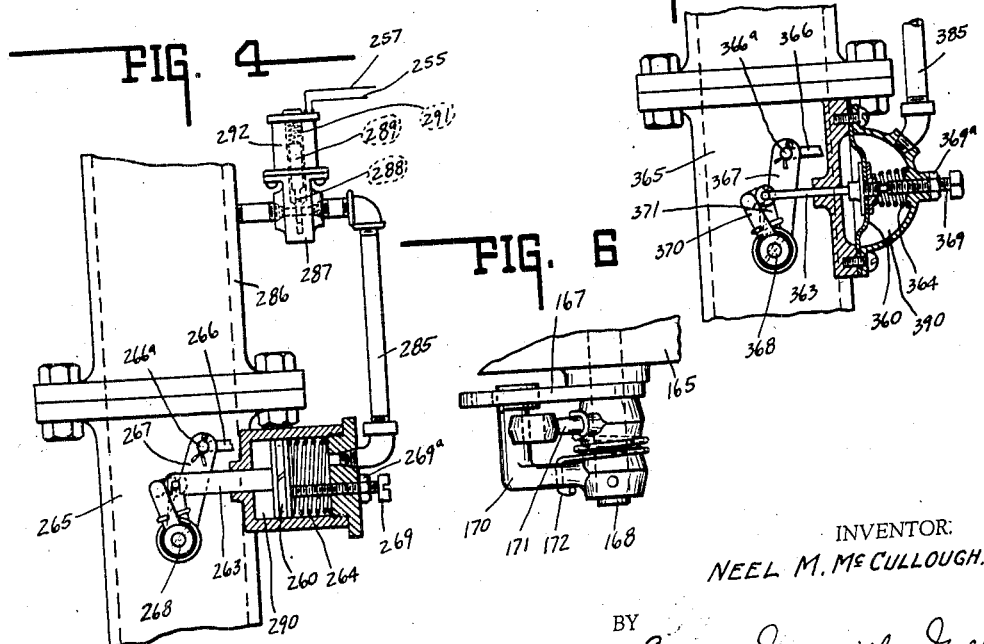
INVENTOR:
NEEL M. McCULLOUGH.
BY
Lockwood Goldsmith & Galt
ATTORNEYS.

Patented Aug. 15, 1939

2,169,267

UNITED STATES PATENT OFFICE 2,169,267

VEHICLE SPEED ENGINE LIMITING DEVICE

Neel M. McCullough, Anderson, Ind., assignor to Pierce Governor Company, Anderson, Ind., a corporation Application July 17, 1936, Serial No. 91,213

5 Claims. (Cl. 175—355)

This invention relates to means responsive to vehicle speed for limiting the speed of an engine of a self-propelled vehicle to prevent overspeeding of the vehicle, as distinguished from regulating the speed of a vehicle by regulating the speed of an engine through means responsive to the speed of an engine.

The chief object of the invention, as indicated by the foregoing, is to permit the engine to operate at what might be termed normal overspeed under conditions where such engine overspeeding does not result in vehicle overspeeding.

If it be assumed that the vehicle is attempting to climb a long steep hill and is starting from rest—for example, at the bottom thereof—then the engine will normally operate through intermediate or low gear speeds at a speed far in excess of the engine speed necessary to operate the vehicle up to a predetermined speed on the level when the engine is driving through what is known as high gear.

Several forms of this broad invention are illustrated herein. Each form of the invention illustrated herein has the characteristics that the control means is electrically operable and is also responsive to the speed of the vehicle for controlling the speed of the engine of the vehicle, preferably by controlling the fuel supply valve, fuel supply lever, et cetera, of the fuel supply system.

The full nature of the invention will be understood from the accompanying drawing and the following description and claims:

In the drawing,

Fig. 1 is a diagrammatic representation of the major portion of one form of the invention, the electric operable control for the engine being shown in elevation and the control for the electric operable control and responsive to the speed of the vehicle being shown in central section.

Fig. 2 is a side view of the former mechanism.

Fig. 3 is an elevational view, parts being broken away to show other parts in central section of another form of engine control responsive to the speed control.

Fig. 4 is a view similar to Fig. 3 and of a modified form of the invention.

Fig. 5 is a view similar to Figs. 3 and 4 and of another modified form of the invention.

Fig. 6 is a plan view of the fuel valve lever arm actuating mechanism incorporated in the forms illustrated in Figs. 3 to 5, inclusive.

In the drawing, 10 indicates a suitable portion of the vehicle and 11 a shaft constituting a part of the speedometer drive having a speed proportional to vehicle speed. Part 10 has a sleeve portion 12 threaded at 13 normally to receive the portion 14 complementarily threaded at 15, which portion 14 is associated with the tube 16 within which is mounted a shaft structure 17 terminating in a tongued drive member 18 having the tongue 19. Shaft 11 has the grooved end 21 with the groove 22 therein that receives tongue 19, as stated. Normally, these parts are detachably connected together in standard constructions, however, in the present instance, a governor responsive switch is interposed therebetween.

The governor responsive switch of the present invention includes a housing 23 which terminates in a sleeve portion 24 interiorly threaded to receive the male threaded portion 12. The housing is closed by the plate 25 secured thereto as at 26. Plate 25 may be suitably supported and includes a bearing 27 which has an exteriorly threaded portion 28.

Shaft 29 is mounted in the housing and terminates in a tongue formed end 30 receivable by the groove 22 and an oppositely projecting grooved end 31, grooved as at 32 to receive the tongue 19 of the speedometer shaft driving member 18, or like member.

Pinned to shaft 29 as at 33 is a collar 34 and pivotally supported thereby are links 35 pivotally connected as at 36 to the members 37. Members 37 are also pivotally connected as at 38 to links 39 pivotally connected to a collar 40 which carries a plate 41. Collar 40 is longitudinally slidable relative to shaft 29. Spring means 42 normally constrains the two linkages, before mentioned, towards the shaft. Each member 37 carries a weight 44. The aforesaid constitutes one form of a centrifugally operable control device. As the speed of the shaft, which is proportionate to the speed of the vehicle, rises and falls, the plate 41 which rotates therewith, moves to the right—see Fig. 1—due to the effect of spring means 42 and moves to the left, in opposition to said spring means 42, in accordance with centrifugal force.

Plate 25 is apertured as at 45 and threaded. Insulated bushing 46 is screwed therein and is locked by the nut 47. Bushing 46 has a threaded aperture 48 adapted to adjustably mount an L-shaped member 49 having the angular extension 50. Lock nut 51 secures the L-shaped arm in adjusted position in the aperture, and maintains portion 50 in predetermined adjusted position relative to the normal position of plate 41 and in accordance with a predetermined vehicle speed.

To reduce the friction to a minimum, there is mounted on the end of the angular portion 50 a roller 52 and interposed therebetween is the ball bearing or similar anti-friction construction 53. When the predetermined vehicle speed is attained, plate 41 rotating in planes parallel to a plane transverse to the axis of the member 49, engages the roller 52 and not only contacts the same but rolls with it. This completes an electrical circuit hereinafter described, since plate 25 is grounded as at 54.

Member 49 is electrically connected to an insulated cable 55 which connects to one terminal of a coil in the form of a magnet structure 56. The other terminal 57 of this coil magnet is connected to the ingnition circuit line 9 controlled by ignition switch 8. The ignition circuit includes the vehicle battery 58 grounded at 59. A keeper 60 is pivotally supported as at 61 on a frame structure 62 which also supports the coil magnet. An arm 63 is connected to a spring 64 which normally constrains the arm 63 toward the inoperative position or non-stop position. When the control circuit is closed through the magnet by means of the centrifugally operated switch structure previously described, or an equivalent device, the keeper is moved toward the magnet and to the right in a counterclockwise direction, see Fig. 1, which movement tilts the arm 63 to the left, see Fig. 1, to interfere with the freedom of movement of the fuel control manually operable member such as lever 67. When thus magnetically tilted, arm 63 with stop 69 lies in the plane of lever arm 67 and prevents further lever arm movement to the right, see Fig. 2, beyond the stop and thus prevents supplying an increased amount of fuel to the vehicle engine. Other forms of stops as well as actuating movements, such as sliding or the like, may be employed in lieu of the specific form herein illustrated and described.

Reference will now be had to Fig. 2. In this figure, 65 indicates a portion of the fuel supply structure, either the carburetor or auxiliary insert, to the engine for propelling the vehicle. A rod 66 is connected to an arm 67 carried by the shaft 68 which mounts a valve, not shown in the supply structure. The arm 63 adjustably supports a stop bolt 69 and a seal wire 70 having the free ends united by seal 71 secures the bolt in the adjusted position. When the vehicle requires the engine to operate at a speed greater than that necessary to propel the vehicle at the predetermined maximum vehicle speed under normal conditions, the rod 66 moves to the right and the arm 67 moves clockwise and is not interfered with by either arm portion 63 or the stop 69.

However, should an attempt be made to increase the engine speed when the vehicle speed is equal to that for which the centrifugally operable or like switch has been adjusted, the magnet circuit will be closed at the centrifugal switch, the magnet will be energized, and the keeper will tilt into closed magnetic circuit position. Arm 63, with adjusted stop 69, is thus tilted into position so that the end of the arm 67 will then engage said stop 69, as shown in Fig. 2, and prevent the engine from being supplied additional fuel above that required to normally drive the vehicle under normal conditions at or about the predetermined maximum vehicle speed for which the centrifugal switch has been set. The foregoing is one of the simplest forms of the invention.

Another form of the invention is illustrated in Fig. 3 and it is to be understood the same is a modification of the form of the invention shown in the right hand portion of Fig. 1 and shown in Fig. 2.

In Figs. 3 and 6 the fuel controlling valve shaft 168 projects beyond the fuel passage portion 165 and lever arm 167 is supported thereby and is operated in the usual manner by the manual control rod 166 connected thereto as at 166a. Shaft 168 has pinned to it at its outer end, an angular stop 170. Between stop 170 and arm 167 is another arm 171 which is free on shaft 168 but held against stop 170 by spring 172 as shown. Rod 163 is notched as at 173 to receive pin 174 carried by arm 171.

When increased vehicle speed is desired, movement of arm 167 counterclockwise secures increased fuel supply because member 167 engages stop 170 and to this is secured shaft 168 carrying the fuel controlling valve.

When the vehicle exceeds the predetermined speed the rod 163 is moved to the right, carrying lever 171 with it, which moves, through spring 172, stop 170 to the right, and lever 167 moves therewith, to reduce the fuel supply. Thus, the overspeed control is inoperative for fuel control purposes at all speeds below the desired maximum vehicle speed and at or above the critical maximum vehicle speed, the control is operative to insure reduction in fuel supply and this prevents overspeeding.

A solenoid 156 is associated with the aforesaid structure and the rod 163 constitutes the movable core of the solenoid. Line 155 to the solenoid, it is to be understood, is connected to the L-shaped member 49, shown in Fig. 1, or equivalent switch device, and the line 157 is connected to the battery 58, as shown in Fig. 1. Thus, when the centrifugal operable switch is closed, solenoid 156 is energized, the core 163 is moved into the position shown in Fig. 3 and the fuel valve carried by shaft 168 reduces the fuel supply so that the engine can only operate up to a certain capacity which corresponds to that of the predetermined maximum vehicle speed under normal conditions of road operation of the vehicle.

When the speed is below that for which the centrifugal switch is set, the solenoid 156 is de-energized and remains in that condition and spring 164 normally tends to maintain the valve in the full open position. The stop 169, as shown, limits the controlling position of the member 163, corresponding to an engine speed proportional to maximum vehicle speed for which the centrifugal switch is adjusted.

In Fig. 4, another modified form of the invention is illustrated and in said figure, 265 indicates a fuel supply structure to the engine, there being included in said structure a valve carried by shaft 268 that mounts an arm 267 connected as at 266a to the rod 266. Rod 263 terminates in a piston 260 normally constrained by spring 264 toward the left, which corresponds to the full fuel supply position. Chamber 290 in which piston 260 operates, adjustably supports a stop 269 locked by the nut 269a against which the piston bears when the valve is in the fuel controlling position.

A conduit 285 communicates at one end with the cylinder 290 and at its opposite end with the intake portion 286, as shown. A valve 287 is interposed in said conduit and includes the movable member 288 having a core 289 that is normally constrained downwardly by means of gravity and/or a spring 291. A solenoid 292 has two lines 257 and 255. Line 255 is connected to a centrifugal switch structure. Line 257 is connected to a battery, the battery and the switch structure being grounded, and a suitable switch structure is shown in the left hand portion of Fig. 1.

The valve member 288, when elevated by means of the core 289, being then positioned as shown in Fig. 4, permits the vacuum in the intake manifold 286 or the like, to be applied to the cylinder 290 to draw the piston 260 from its extreme position in the left in said cylinder to the position shown in Fig. 4, where it abuts stop 269. In this position, the fuel valve carried by shaft 268, limits the fuel supply to the intake to that corresponding to the maximum vehicle speed for which the centrifugal switch is set.

In Fig. 5 a modified form of the invention is illustrated and this is also of the pressure application type and is likewise shown of the vacuum form thereof. It, of course, is to be understood if pressure is used in place of vacuum that the pressure would be applied to the opposite face of the piston or to the opposite face of the diaphragm which is the modified form illustrated in this figure, (Fig. 5).

In this form the fuel supply structure is indicated by the numeral 365 controlled by a fuel supply valve carried by shaft 368 supporting actuating arm 367 having the connection 366a by which it is connected to the actuating rod 366. Rod 363 is connected to the diaphragm 360. The diaphragm is shown in the fuel controlling position, wherein it abuts the adjustable stop 369 secured in said position by the lock nut 369a. The spring 364 normally constrains the diaphragm toward non-fuel controlling position. The conduit 385 is connected to the engine so it is subject to the vacuum thereof substantially as shown in Fig. 4. Thus, when the solenoid 292— see Fig. 4—is energized, vacuum is applied to the diaphragm chamber 390. The central portion of the diaphragm is thus caused to expand or move to the right, which carries with it the fuel controlling valve for fuel control, as previously set forth.

The forms of the invention illustrated in Figs. 3, 4, 5 and 6 relate to a direct or positive connection to a fuel throttle valve in an auxiliary valve housing and substantially the same means may be used to interpose a high speed in front of the carburetor throttle shaft lever or throttle control rod without departing from the broad disclosure of these forms of the invention.

It is the intent, with the structures shown in Figs. 3 to 6 inclusive, to limit the driver's control of the fuel intake to the position of the devices illustrated and which position has been determined to be the maximum vehicle speed desired when the vehicle is in high gear and travelling on level ground, the lever connecting spring being designed to give higher fuel intake capacity when the control means is relatively inoperative at lower vehicle speeds.

The basic invention, therefore, is directed to a centrifugally operable switch responsive to the speed of the vehicle for controlling the fuel supply to the engine of that vehicle to prevent speeding of the engine above that necessary to produce predetermined maximum vehicle speed but which is so arranged that it permits the engine to overspeed whenever required so long as the vehicle speed is not above that for which the device is set and beyond which the vehicle is not intended to travel.

Except where specifically set forth in the claims, it is to be understood that the "speedometer" drive is illustrative only of a vehicle speed responsive drive for the control device.

While the invention has been described in great detail in the foregoing specification, the same is to be considered as illustrative and not restrictive in character. But one form of centrifugally operated switch is illustrated. Other forms may be readily substituted for that specifically illustrated. One feature, however, is highly desirable and that is the attachment feature whereby the centrifugal switch of whatever type or construction is employed, may be inserted or interposed between the speedometer drive connection to the transmission and the speedometer drive per se. Also, as before stated, vacuum or pressure may be associated with the operating means for actuating the fuel controlling valve.

The invention claimed is:

1. In a vehicle having a driving outlet such as a speedometer drive operable proportional to the vehicle speed and/or adapted for detachable connection to a speed indicating device such as a speedometer, the combination with a drive attachment detachably interposed therebetween for speedometer or like driving and including a speed responsive means operable thereby and movable proportional to the vehicle speed, and switch means arranged for actuation upon the vehicle reaching predetermined maximum vehicle speed for circuit control, of a control for the vehicle engine such as a movable stop, and electrical means operatively associated with the movable control for controlling vehicle speed through engine fuel control to prevent overspeeding of the vehicle and when the switch means is actuated.

2. A vehicle speed control device, including switch means automatically operable at predetermined vehicle speed, an electrical coil structure controlled by the switch means, a vehicle engine manually operable control means, and means, operable upon coil structure operation, preventing manual operation of the control means beyond that adjusted to secure predetermined vehicle speed.

3. A device as defined by claim 2, characterized by said coil structure operable means including a pivotally mounted member tiltable upon coil structure operation to constitute a barrier to engine control means continued operation beyond the tilted member.

4. In a device of the character described, the combination of a manually operable member for controlling the fuel supply of an engine of a vehicle, a coil structure, means responsive to the vehicle speed operating said coil structure at predetermined vehicle speed, and coil structure operable means controlling the movement of said member.

5. A device as defined by claim 4, characterized by the coil structure upon energization moving said coil structure operable means into position to restrict the fuel supply to the engine to predetermined maximum operation, and by the addition of spring means constraining said coil structure operable means into non-controlling position upon coil structure deenergization.

NEEL M. McCULLOUGH.